May 13, 1924.
A. H. JESSEN
1,493,985
TRANSMISSION MECHANISM
Original Filed July 2, 1917   4 Sheets-Sheet 2
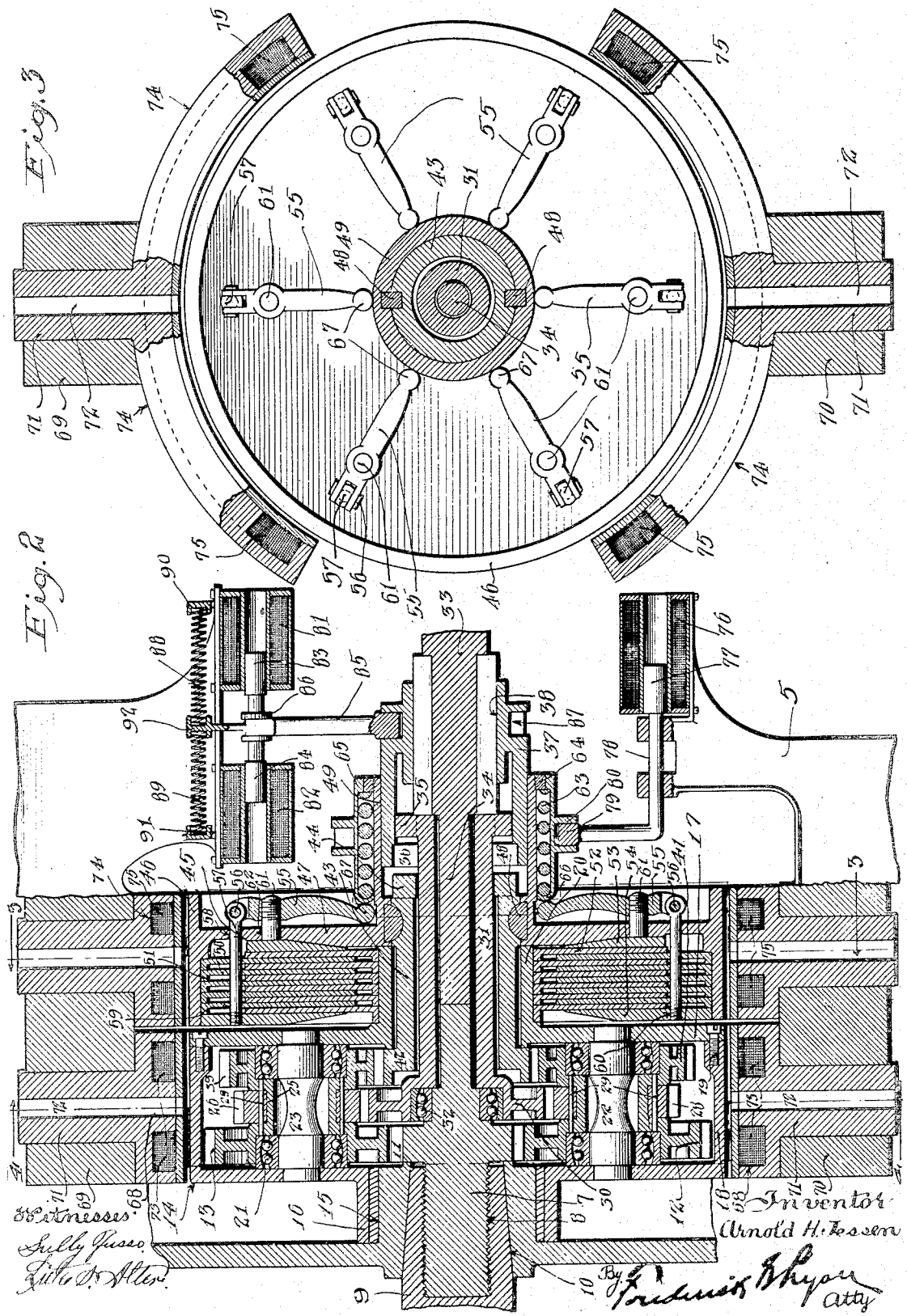

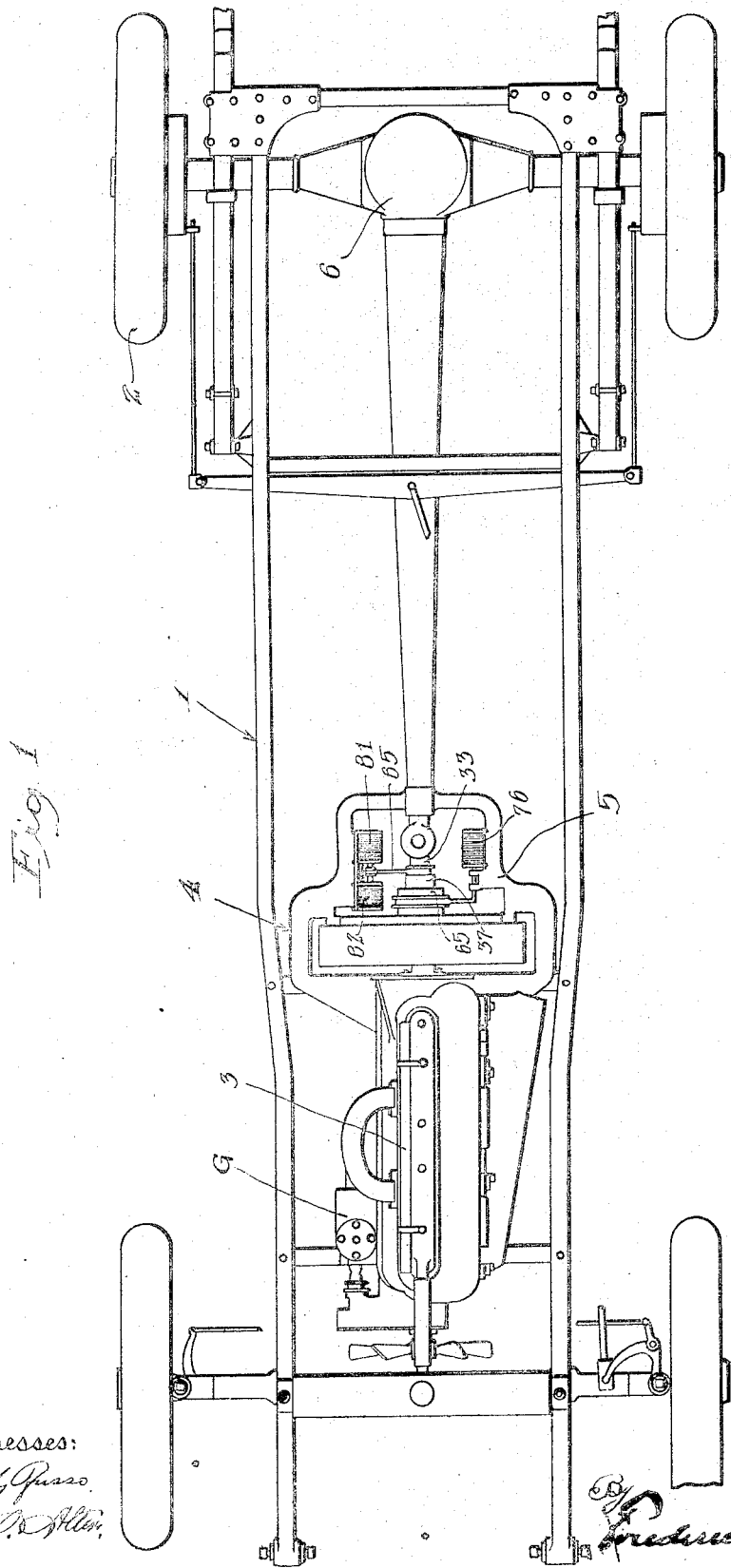

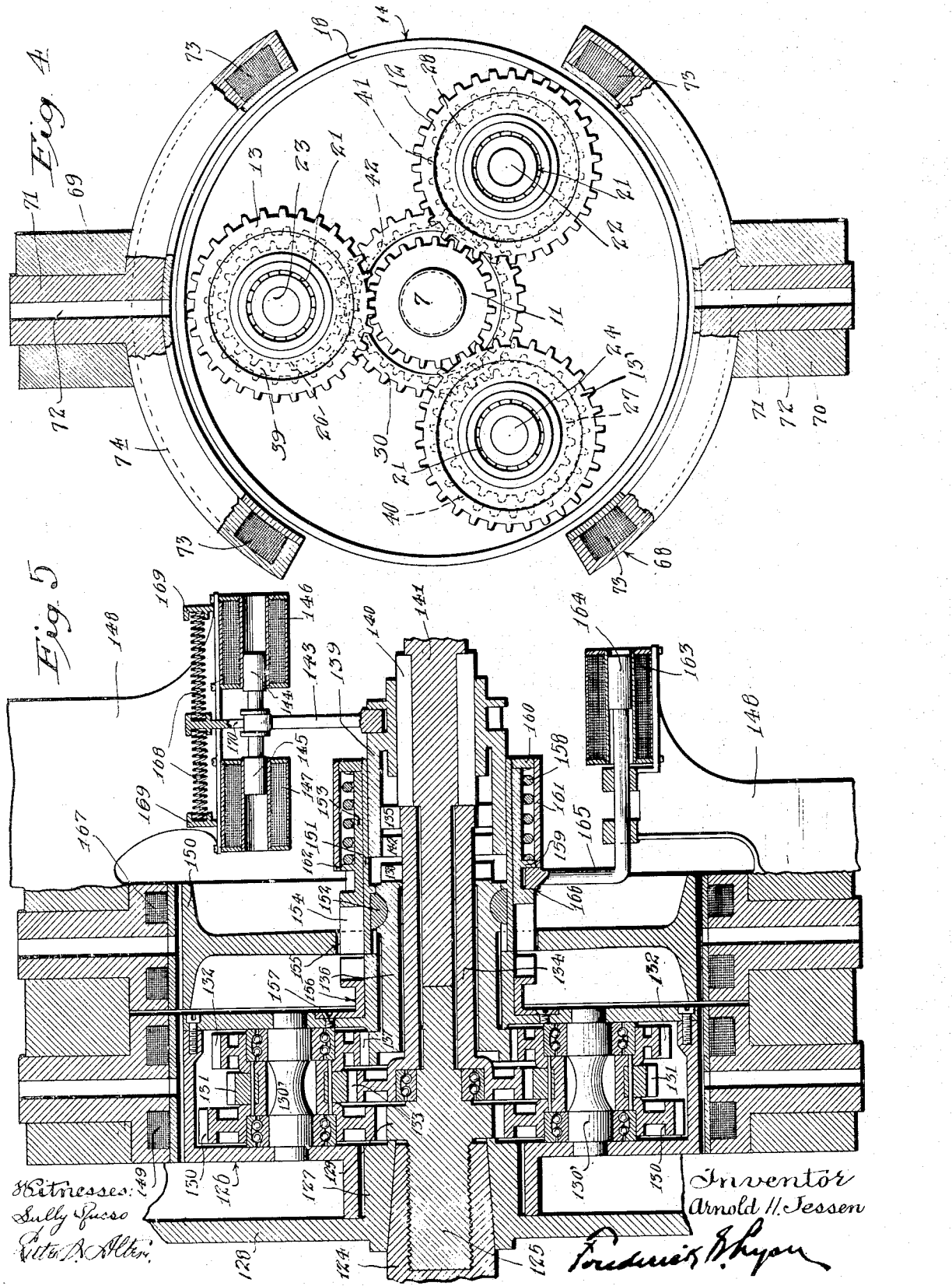

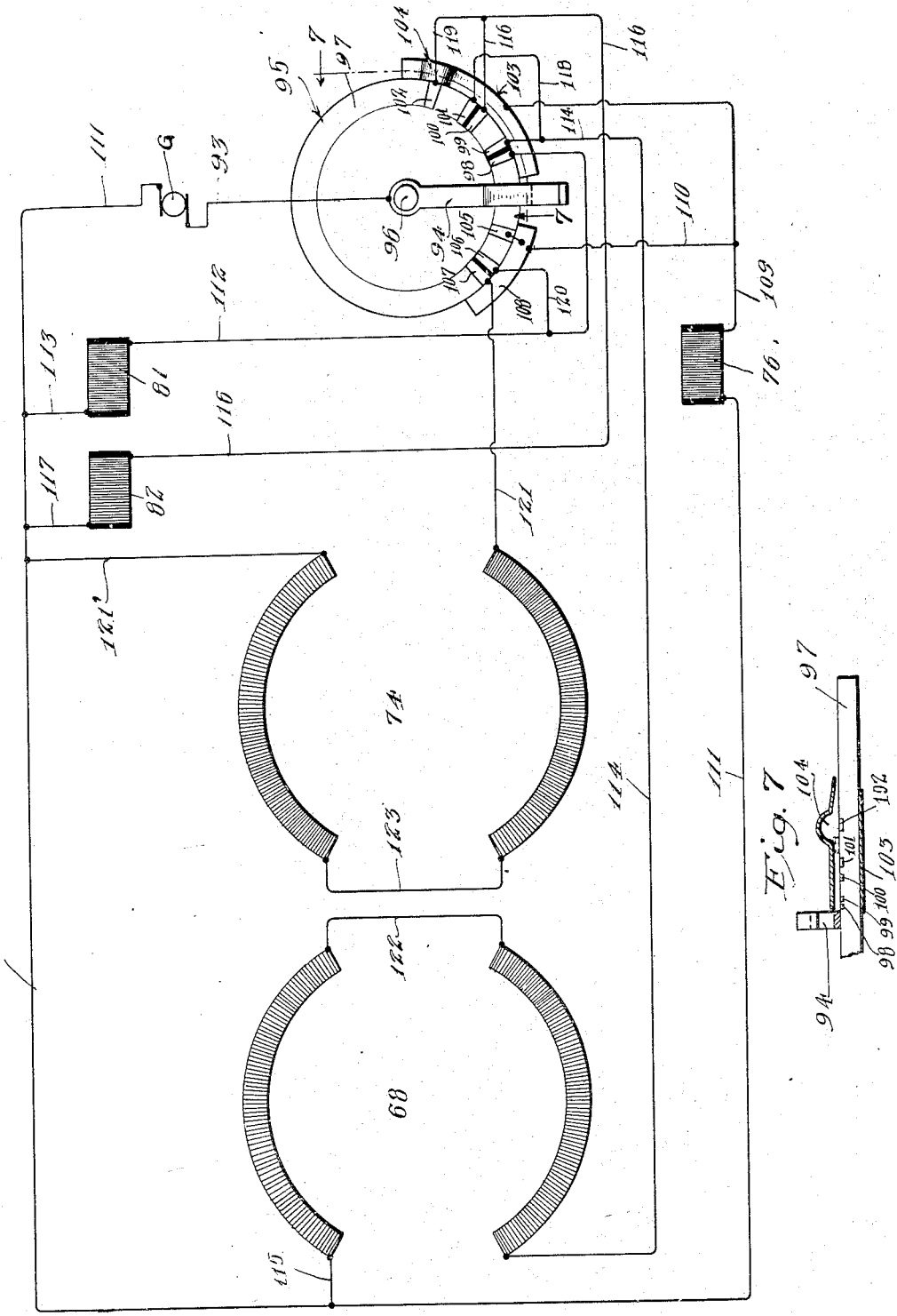

Patented May 13, 1924.

1,493,985

UNITED STATES PATENT OFFICE.

ARNOLD H. JESSEN, OF LOS ANGELES, CALIFORNIA, ASSIGNOR OF TWO-FIFTHS TO (MRS.) LORA B. VAN LEUVEN, OF LOS ANGELES, CALIFORNIA.

TRANSMISSION MECHANISM.

Application filed July 2, 1917, Serial No. 178,243. Renewed May 7, 1923.

*To all whom it may concern:*

Be it known that I, ARNOLD H. JESSEN, a citizen of the United States, residing at Los Angeles, in the county of Los Angeles and State of California, have invented a new and useful Transmission Mechanism, of which the following is a specification.

This invention relates to improvements in transmission mechanism for motor vehicles and resides in the provision of a magnetic selective planetary transmission having several speeds forward and reverse.

An object of the invention is to provide transmission mechanism of the above named character which will eliminate gear shifting and which will not "grab" and cause the vehicle to jerk when starting.

Another object is to provide transmission of the character described which may be controlled and operated from the steering wheel of a motor vehicle, and is entirely automatic in operation, the ordinary gear shift lever and pedal clutch operating means being eliminated.

A further object is to provide transmission mechanism which may be used as an emergency brake and is simple in construction.

In the majority of transmission mechanisms, and especially in those where three speeds forward are provided, it is necessary to provide a great number of parts and the construction of these devices has been complicated and costly, making their use practically prohibitive. In these devices where a two speed forward and one reverse is provided, it is necessary that three brake drums be used, and that four drums be used on a three speed forward and one reverse; whereas with my mechanism it is only necessary to use two brake drums, and three speeds forward and one reverse may be obtained. It is therefore an object of this invention to provide a selective planetary transmission mechanism of simple and inexpensive construction which combines the advantages of the simple form of planetary transmission with those of the selective types of transmission, and in so doing simplifies transmission mechanism, eliminates gear shifting, "grabbing" and other undesirable features of the generally used type of transmission.

The accompanying drawings illustrate the invention:

Figure 1 is a top plan view of a motor vehicle chassis showing the motor and the transmission mechanism in position.

Fig. 2 is a horizontal sectional view of the mechanism.

Fig. 3 is a cross sectional view taken on line 3—3 of Fig. 2.

Fig. 4 is a sectional view taken on line 4—4 of Fig. 2.

Fig. 5 is a horizontal sectional view taken through the modified form of mechanism.

Fig. 6 is diagrammatic view of the electrical wiring for the mechanism.

Fig. 7 is a sectional view taken on line 7—7 of Fig. 6, showing the lever in advanced position in dotted lines.

Referring to the drawings, particularly Fig. 1, 1 designates as an entirety a motor vehicle chassis mounted upon wheels 2 and supporting motor 3. The transmission mechanism designated 4 as an entirety is operatively connected with the motor 3 and is supported by suitable frame work 5 therefor which is connected with the chassis 1, the mechanism 4 being located between the motor 3 and differential means 6 of the motor vehicle.

The mechanism 4 comprises a main shaft 7 which is screw-threaded perferably as at 8 within the end of the motor or engine shaft 9, the latter being mounted within a bearing 10 forming a part of the flywheel. Carried by the shaft 7 is a main gear 11 which meshes at equidistantly spaced points with the gears 12, 13 and 13'. The gears 12, 13 and 13' are carried within a circular drum 14 which is rotatably mounted upon a bearing 15 comprising the hub of the motor flywheel, there being provided an annular outwardly extending bearing flange 16 centrally on one side of the drum which rests upon the bearing 15. By coupling the transmission mechanism to the hub of the flywheel a compact power unit consuming but a small place is provided. The other side wall 17 of the drum is removably secured to the peripheral wall 18 by screws 19 and is provided on its outer face with an annular outwardly extending flange 20, which is for a purpose to be later more fully described. The gears 12, 13 and 13' are mounted upon bearing balls 21; the latter being supported by shafts 22, 23 and 24, which are secured to and mounted between the walls 14 and 17 of the drum. Each of the gears 12, 13 and 13' is provided with a central cylindrical hub portion 25 which extends outwardly from each gear. Gears 26, 27 and 28 are mounted upon the hub portion 25 of the gears 12, 13 and 13', the gears being fixed to the hub portion by pins 29. These gears 26, 27 and 28 mesh with a gear 30 which is carried on the end of a tubular low speed shaft 31. The shaft 31 is mounted upon a bearing 32 at one end thereof, said bearing being carried on the shaft 7, the shaft 7 extending into the tubular shaft 21 for a slight distance. A driven shaft 33 has a reduced portion 34 extending within the tubular shaft 31 and abutting the end of the shaft 7, both the portions of the shafts 7 and 33 which extend into the shaft 31 being circumferentially spaced therefrom. A clutch member 35 is fixed to the rear end of the shaft 31 and is adapted to cooperate with a sliding clutch member 36 carried upon a sliding clutch sleeve 37 which is splined as at 38 upon the shaft 33. The clutch member 35 will hereinafter be referred to as the "low gear" clutch member.

Carried by the hub members 25 of the gears 12, 13 and 13', are intermediate speed gears 39, 40 and 41. These gears mesh with the gear 42 which is carried by and preferably formed integrally with a tubular shaft 43 that surrounds or is spaced from the tubular intermediate speed shaft 31. At its outer end the shaft 43 carries an intermediate speed clutch member 44 which is adapted to cooperate with the sliding member 36.

When the mechanism is in the position shown in full lines in Fig. 2 of the drawings, it is in "low gear," power being transmitted from the motor shaft 9 through the main shaft 7, gear 11, gears 12, 13 and 13', gears 26, 27 and 28 which rotate with the gears 12, 13 and 13', gear 30 which meshes with the gears 26, 27 and 28, shaft 31, clutch members 35 and 36, clutch sleeve 37 to the driven shaft 33. When the mechanism is in the position shown in Fig. 4 of the drawings, power is transmitted from shaft 9, shaft 7, gear 11, gears 12, 13 and 13', gears 39, 40 and 41, which rotate with gears 12, 13 and 13', gear 42, which meshes with gears 39, 40 and 41, shaft 43, intermediate clutch members 44, sliding clutch members 36, clutch sleeve 37 to the driven shaft 33.

To provide for a "high speed," that is, a direct drive from the motor to the driven shaft, there is employed a multiple disk clutch member 45. An annular drum 46 the same circumference as the annular drum 14 surrounds the shafts 31 and 43. This drum 46 is secured to and preferably formed integrally with a circular plate 47 which is keyed centrally as at 48 upon the shaft 43 adjacent to the rear end of the shaft. The outer edge of the flange 20 engages the face of the plate 47 and extending outwardly from and formed integrally with the plate 47 centrally thereof is a cylindrical collar or sleeve 49 which receives and engages the sliding clutch sleeve 37. It will thus be seen that the drum 46, together with the plate 47, rotates with the shaft 43. Secured to the inner face of the drum 46 are a plurality of circular clutch disks 50 which surround the flange 20 and are spaced therefrom and from one another. These disks 50 may be secured in any suitable manner to the drum 46 and at their inner edges are provided with offset portions 51 which cause the disks to be spaced from one another. A plurality of similar clutch disks 52 are secured to the flange 20 and extend between the disks 50 so as to have frictional engagement, it being noted that these sets of disks are relatively movable. The set 52 being virtually carried by the casing 14, whereas the set 50 is carried by the drum 46 that is adapted for rotation relative to or with the drum 14.

There is provided means for forcing the disks together so that they will come into close frictional engagement and function as a clutch. This means comprises two clamping rings 53 and 54 which engage on opposite sides of the sets of disks, the one 53 engaging the outermost of the disks 52, whereas the one 54 engages the other outermost disk 52. Operating levers 55 are mounted radially upon the outer side of the plate 47 and at their outer ends are pivoted as at 56 to bolts 57 that extend through openings 58 in the plate 47, openings 59 in the disks 50 and are screw-threaded as at 60 to the plate 54. Secured to the levers 55 at points intermediate their ends are fulcrum lugs 61 that are slidably mounted within openings 62 formed through the plate 47. At their inner ends these lugs 61 are rigidly secured to the ring 53. When the inner ends of the levers 55 are pushed inwardly the lugs 61 are correspondingly moved causing the ring 53 to press against and force the disks 52 and 51 into close frictional engagement. At the same time through the medium of the bolts 39' the ring 54 is pulley towards the ring 53 and the combined action of these rings provides for a severe clamping action such as will hold the disks in close frictional engagement.

There is provided means for operating the levers 55 which comprise a helical expansion spring 63 mounted upon the collar or sleeve 49. A ring 64 is screw-threaded upon the outer end of the sleeve or collar 49 and acts as an abutment for the spring 63. A sleeve 65 is slidably mounted upon the collar 49 and ring 64. One end of the sleeve is provided with an inwardly extending annular flange 66 which acts as an abutment for the other end of the spring 63 and engages the inner ends of the levers 55, said inner ends being provided with knobs or enlarged as at 67. The spring normally holds the sleeve 65 in engagement with the inner ends of the levers in operative position, such as will cause the rings 53 and 54 to clamp the disks 50 and 52 together. When it is desired to put the mechanism in "high gear" so as to provide for a direct drive from the motor to the driven shaft, the sleeve 65 is allowed to be moved by the expansive action of the spring 63 so as to engage and lock the levers 55 on their fulcrum lugs 61. This action, as hereinbefore described, locks the disks 50 and 52 in close frictional engagement and the entire mechanism is rotated as though the driven shaft were directly connected with the motor shaft.

There is provided electromagnetic means to hold the drum 14 against rotation so that the gears 12, 13 and 13' and the other gears connected therewith will not have a circumferential or planetary movement relative to the gears 11, 30 and 42. This means comprises magnet members 68 mounted on opposite sides of the drum 14 and supported in frame members 69 and 70. There are provided projections 71 intermediate of the ends of the magnet members 68 which extend into and are secured to the members 69 and 70, the members 71 being provided with a wire or electrical conductor passage 72 extending therethrough and through the members 68. At their ends the magnet members 69 are provided with electromagnet coils 73 which when energized attract the drum 14, said drum being only slightly spaced from said magnet members. The lines of magnetic influence thus set up serves to hold the drum 14 against rotation as will be later described. Similar magnet members 74 are mounted upon opposite sides of the drum 46 in the same relation to said drum as are the members 68 of the drum 14. These members 74 are provided in their ends with electromagnet coils 75. These members 74 function in the same manner as the members 68. It will therefore be seen that the electromagnet means for holding the drum 14 and drum 46 against movement act as clutches and as brakes as well. When the device is in position shown in Fig. 2 of the drawings, in low gear, before the driven shaft can be rotated, the drum 14 must be held against rotation. In practice, and as will be later more fully described, the electrical energy for the magnet members 68 is obtained from the generator A of the motor vehicle, thus when the vehicle is starting, running slowly and gradually increasing in speed the magnetic influence also gradually increases and serves to gradually bring the drum 14 to a stop and in this way "jerking" of the vehicle or "grabbing" as is sometimes done with the ordinary clutch, is eliminated. It is noted that as the electrical energy is obtained from the generator A when the motor vehicle is run at a higher rate of speed, the generator is driven correspondingly fast and generates more electricity, therefore providing for a greater magnetic influence and insuring the holding of the drum 14 against movement. The magnet members 74 are energized as will be later more fully described to provide for a reverse motion of the mechanism and reverse rotation of the driven shaft.

There is provided electromagnetic means in the form of a solenoid 76 for operating the slidable sleeve 65. The solenoid 76 is secured to the frame 5, its slidable armature 77 being secured to and mounted within the space between annular flanges 80 formed on the periphery of the sleeve 65. This construction allows the sleeve to rotate freely and when the solenoid is energized the armature 77, arm 78 and the sleeve 65 are pulled rearwardly to allow the levers 55 to give and release the clamping rings 53 and 54. When this is done the mechanism may be put into low or intermediate speeds or reverse.

There is provided a similar magnetic means for operating the clutch sleeve 37 and slidable clutch member 36. This means comprises two solenoids 81 and 82 arranged opposite one another in spaced relation, the armatures 83 and 84 of the respective solenoids being connected with one another. An arm 85 is loosely mounted upon the armatures at a point where they are joined and between annular flanges 86 formed on the armatures. The other end of this arm is slidably mounted within an annular groove 87 formed in the sleeve 37. When the solenoid 81 is energized the armature 85 is moved rearwardly causing the sleeve 37 to be moved correspondingly and the slidable clutch 36 to engage with the low gear clutch member 35, thus placing the mechanism in low gear. When the solenoid 82 is energized, the arm 85 and sleeve 37 are moved in the opposite direction to cause the sliding clutch member 36 to engage with the intermediate clutch member 44 and the mechanism is thus placed in intermediate gear.

As a means to return the slidable clutch member 36 to normal position, that is, to move it out of engagement with either of the clutch members 35 and 44, there are provided expansion springs 88 and 89 which are secured to and abut plates 90 and 91 carried by the frame 5. The arm 85 is provided with an extension 92 opposite sides of which are secured to and engage the springs 88 and 89. The equal forces of these springs provide for the returning of the arm 85 and its cooperating parts to normal position when the solenoids 81 and 82 are de-energized, or, in other words, "declutch" the engine.

Referring to Fig. 6 of the drawings, wherein there is illustrated a diagrammatic view of the wiring for the device, the source of current is the generator which is operated by the motor 3 of the vehicle. A conductor 93 is connected with one side of the generator G and with an operating contact lever 94 forming a part of the control and operating means designated 95 as an entirety. The lever 94 is pivoted at its inner end as at 96 to some suitable part of support, not shown, or to the steering wheel of the automobile, also not shown, and is adapted to ride upon a contact supporting ring 97 which may also be supported after a manner, not shown, upon the steering wheel of the automobile. As shown in the diagram the lever is in neutral position and to the right of the lever, and upon the ring 97 contacts 98, 99, 100, 101 and 102 are mounted, the contacts being spaced and insulated from one another. The lever is adapted to engage both of the contacts 98 and 99 and then after moving off contact 99 may engage both the contacts 100 and 101. An arcuate bridge contact member 103 is secured along the periphery of the ring, one end being located in advance of the contact 98 and the other beyond the contact 102. The upper side of the lever is adapted to engage the under side of this bridge contact member simultaneously with the engagement of the contacts with the exception of the contact 102. At a point opposite the contact 102 the bridge contact 103 is bowed upwardly as at 104 so that the lever 94 does not come into contact therewith at the time said lever engages contact 102 for a purpose to be later more fully described.

On the left of the lever, as shown in the diagram, contacts 105, 106 and 107 are mounted upon the ring 95. The contacts 106 and 107 are mounted in close relation to one another so that the lever 94 may contact with both at the same time. A bridge contact member 108 similar to the contact member 103 is secured to the ring 97 with one end in electrical contact with the contact 105 and its other end extended beyond the contact 107. A conductor 109 is connected with the bridge contact member 103 and with the solenoid 76. A conductor 110 connects the bridge contact member 108 with the conductor 109. A conductor 111 is connected with the other side of the generator G and the solenoid 76. Connected with the contact member 98 is a conductor 112 which is connected with the solenoid 81 and a conductor 113 connects the solenoid 81 with the conductor 111. Connected with the contact member 99 is a conductor 114 which is also connected with the magnet member 68 and a conductor 115 connects the magnet member with the conductor 111. Connected with the contact 100 is a conductor 116 which is connected with the solenoid 82 and a conductor 117 connects said solenoid to the conductor 111. The contact member 101 functions the same as the contact member 99 and a conductor 118 connects the contact member 101 with the conductor 114. The conductor 102 functions in the same manner as the conductor 100 and a conductor 110 connects said contact 102 with the conductor 116. The contact 106 is connected with the conductor 112 by a conductor 120 and the contact 107 is connected with the magnet member 74 by a conductor 121. A conductor 121' connects magnet 74 with conductor 111. It is noted that the magnet members 68 and 74 each comprise two magnets. The two magnets of the magnet member 68 are connected by a conductor 122 and the two magnets of the magnet 74 are connected by a conductor 123.

In the operation of the mechanism, assuming that the control lever 94 is in the position shown in the diagram in Fig. 6 and the motor of the motor vehicle has been started and is running, to place the mechanism into first or low speed, the lever is moved to the right, first contacting with the bridge contact member 103 and when this is done current from the generator G flows through conductor 93 to lever 94, bridge contact member 103, conductor 109, solenoid 76 and from solenoid 76 back to the other side of the generator G. The strength of the current is of course in direct proportion to the speed of the generator. When the solenoid 76 is thus energized, its armature 77 is pulled rearwardly causing the arm 78 to pull the sleeve 65 rearwardly against the action of the spring 65. This releases the leverage action of the levers 55 and the multiple disk clutch is loosened so that the disks 52 may rotate relative to the disks 50, or vice versa. The lever 94 is then advanced to the right so as to engage contact 98 at the same time engaging bridge contact member 103 and holding the solenoid 76 energized. When the lever engages the contact 98, the current flows from the generator G to conductor 93, lever 94, contact 98, conductor 112, solenoid 81, conductor 113 and through conductor 111 back to the generator G. This energizes the solenoid 81 and causes the armature 83 to be pulled rearwardly and a corresponding movement is given the sleeve 37 through the medium of the arm 85. When the sleeve 37 is moved rearwardly the clutch member 36 engages and cooperates with the low gear clutch member 35 and the mechanism is in position for low or first speed. The lever is moved further to the right and engages contact 99 at the same time holding its contact with contact 98 and bridge contact 103. The current still flows through the conductors as described and at the same time from lever 94 through contact 99, conductor 114, magnet member 68, conductor 115 and conductor 111 back to the generator G. At this time the magnet member 68 is energized and the magnetic influence set up on the drum 14 which acts as an armature, serves to hold said drum against its natural rotative tendency and is brought about gradually as the magnetic influence increases due to the increasing speed of the motor which correspondingly increases the speed of the generator G. It will be seen that the magnet members cooperating with the drum have the same function as the ordinary clutch. However, it is noted that the motor controls the action of the magnet members, in that it drives the generator which provides current for the magnet members. When the casing 14 is held against rotation the planetary action of the gears 12, 13 and 13′ is stopped and these gears rotate while held stationary on their bearings, causing a corresponding rotation of the gears 26, 27 and 28 which mesh with the gear 30 on the low gear shaft 31 and as the clutch members 36 are cooperating with the low gear clutch members 35, the low or first speed is obtained. It will thus be seen that the contact members 98 and 99 are utilized as a unit in connection with the bridge contact member 103 and that in order to place the mechanism in first or low speed it is only necessary to make one movement of the lever to a predetermined point in order that said lever may at the beginning of its movement engage the contact member 103 and then the contact members 98 and 99 holding its contact with the three contact members 98, 99 and 103.

To go from low to second or intermediate, the lever is moved further to the right so as to come into contact with contact members 100 and 101, consecutively, the lever all the time holding its contact with the bridge contact member 103. When the lever engages the contact member 100 current flows from generator G, conductor 93, lever 94, contact member 100, conductor 116 to the solenoid 82, and from solenoid 82 through conductors 117 and 111 back to the generator G. This energizes the solenoid 82 which causes its armature 84 to move to the left of that position shown in Fig. 2 of the drawings, and the clutch sleeve 37 is moved forwardly, causing the clutch members 36 to cooperate with the intermediate clutch members 44 and the gears are thus placed in second or intermediate position. Before the lever leaves the contact 100 in its further movement to the right it engages contact 101 and the current from the generator which is at this time still flowing through the conductor 93 and lever 94 passes from contact 101 through conductor 118 to conductor 114 to magnet member 68 and from thence back to the generator through conductors 55 and 111. This energizes the magnet members 68, as previously described, and the clutch effect is provided so as to hold the drum 14 against rotation and the planetary gears against circumferential movement relative to the gears meshing therewith. Therefore, the gears 39, 40 and 41 which mesh with the gear 42 on the intermediate speed shaft 43 rotate said shaft and as the clutch members 44 and 36 are in cooperative engagement the second or intermediate speed is transmitted to the wheels of the automobile through the driven shaft 33. It will thus be seen that the second movement of the lever a predetermined distance will result in the placing of the transmission mechanism in second or intermediate speed and in immediately applying power to the rear wheels of the automobile.

To go from second or intermediate speed into high speed, the lever is given its third movement and when it passes from the contact 101 it passes the point in the bridge member 103 where the upwardly bowed portion 104 is formed, thus the lever 94 does not come into contact with the bridge contact member 103 and the magnet 76 is therefore immediately de-energized. This allows the spring 63 to force the sleeve 65 forwardly so that the sleeve engages and rocks the levers 55. When this is done the lugs 61 on the levers move inwardly and force the ring 53 into clamping engagement with one of the disks 52, whereas the bolts 59 are pulled and pull the ring 54 towards the ring 53. This action, as previously described, causes the disks 50 and 52 to come into close frictional engagement and interlocks the drum 46 and drum 14 so that they may rotate together. At this time no magnetic influence is set up through the magnet members 68 and 74 and the drums 14 and 46 rotate together. Since the shaft 43 for the second or intermediate speed is keyed as at 48 to the plate 47 that is integral with the drum 46, it is necessary to move the clutch member 36 into cooperation with the intermediate clutch member 44, and before the lever 94 moves past the bowed portion 104 of the bridge 103, it touches the contact 102 which functions the same as the contact 100 and current then flows from generator G through contact 93, lever 94, contact 102, conductor 119, conductor 116, solenoid 82 and from solenoid 82 back to generator G through conductors 117 and 111. This, as previously described, causes energization of the solenoid 82 which moves the sleeve 37 forwardly and the clutch member 36 into cooperation with the clutch member 44, causing the mechanism to be placed in intermediate speed. However, this does not provide intermediate speed inasmuch as the rear wheels are driven directly from the motor because both the drums 14 and 46 together with their cooperative mechanism rotate correspondingly. It will thus be seen that the third movement of the lever a predetermined distance will immediately place the transmission mechanism in high speed or "direct drive." It will be noted that when the lever 94 is moved from its first to its second position the solenoid 81 is de-energized since the lever moves out of engagement with the contact 98 and upon de-energization of the solenoid 81 the springs 88 and 89 tend to force the solenoids, the arm 85, sleeve 37 and clutch member 36 into neutral position, as shown in Fig. 2 of the drawings. Thus the mechanism or engine is declutched and the clutch is not moved into position until after the gears are moved in second or intermediate speed. This same action takes place in going from second to high speed or in going from any one speed to another.

In order to declutch the engine when the mechanism is in high speed position the lever is moved to the right past the bowed portion 104 of the bridge contact member 103 so that it again comes into contact with the bridge contact member 103 and the solenoid 76 is again energized. At this time the lever has moved out of engagement with the contact 102 and the solenoid 82 is de-energized, allowing the clutch member 36, as previously described, to return to normal position and as the solenoid 76 is energized the armature 77 together with the arm 78 and sleeve 65 will be moved rearwardly releasing the levers 55 and allowing the disks 50 and 52 of the multiple disk clutch member to have relative movement. It will be seen that the driven shaft 33 is not connected with the transmission mechanism for rotation, the main shaft 30 and all of the gears connected therewith rotating freely, however, the gears 12, 13, 13', 26, 27, 28, 39, 40 and 41 having planetary movement relative to the gears 11, 30 and 42. The motor may be stopped in the ordinary manner.

Assuming that the motor vehicle is to be stopped, or after being stopped, "reverse" is desired, the lever is moved past the adjacent end of the bridge contact member 103. In this connection it is noted that the bridge contact member 103 at its end adjacent to the contact member 102 is aslant gradually downwardly so as to lie close to the ring 97, the member 103 being constructed of spring metal, preferably. The lever 94 is then moved to the left and its pivot 96 is so arranged that the lever may ride over and upon the upper side of the bridge 103 past the other end of the bridge to its neutral or supporting position. The lever may be moved from neutral position to either low or reverse position as desired, and it will be noted that the lever may be moved from high speed position into intermediate position and from thence into low if so desired. The actions will be readily apparent and no further description is thought necessary to make clear the operation when the lever is moved from high to intermediate speed and from intermediate to low speed. If the motor vehicle is to remain stationary the lever is left in this position but if reverse is desired the lever is moved to the left, coming into engagement with the contact 105 and causing the solenoid 76 to become energized. The current in this instance flows from generator G, conductor 93, lever 94, contact 105, bridge contact member 108, conductor 110. solenoid 76 and back to the generator through conductor 11. Energization of the solenoid 76 causes the sleeve 65 to be pulled away from and out of engagement with the levers 55 and this throws the multiple disk clutch "out," the disks 50 and 52 being permitted relative movement. Further movement of the lever to the left is given causing the lever to engage with contact 106 and current then flows from the lever 94 through contact 106, conductor 120, conductor 112. solenoid 81 and conductors 113 and 111 back to the generator G energizing the solenoid 81 and moving the mechanism previously described into low gear. As the lever is moved further it engages the contact 107 without being moved out of engagement with contact 106 and current then flows from lever 94 through contact 107, conductor 121, magnet member 74, conductor 121' and conductor 111 back to the generator G, thus energizing the magnet member 74. When the magnet member 74 is energized it sets up a magnetic influence upon the drum 46 holding said drum against rotation, and as the intermediate speed shaft 43 is keyed to the plate 47 carried by the drum 46 the gear 42 will be held stationary and the gears 39, 40 and 41 meshing therewith will have a reverse rotation which is transmitted through the gears 26, 27, and 28 to the gear 30 mounted on the low gear shaft 31. It will thus be seen that the reverse direction is transmitted through the low gear shaft 31 to the driven shaft 33. To move the mechanism out of reverse position, the lever is moved further to the left so that it does not contact with the contacts 106 and 107 but contacts with the bridge member 108 and is moved past the adjacent end of the bridge member. The adjacent end of the bridge member is slanted downwardly so as to lie close to the ring 97 and the lever may be moved towards the right and over and upon the bridge member so as to not engage the contacts 105, 106 and 107 and into neutral position. It will be noted that when the lever is placed into either low or reverse position a braking action on the motor may be had, and this arrangement may be provided for in case of emergency.

In Fig. 5 of the drawings, there is provided a modified form of the invention in which the parts of the mechanism with the exception of the multiple disk clutch are identical with those parts of the preferred form of the invention. In this form instead of employing a multiple disk clutch to connect the two drums with one another so that high speed or direct drive may be obtained, there is employed a jaw clutch means which will be later more fully described.

In the modified form, the drive shaft 124 is connected with the shaft 125 in the same manner as are the corresponding shafts in the preferred form of the invention, and a drum 126 identical in construction to the corresponding drum in the preferred form of the invention is rotatably mounted upon a bearing 127 which comprises the hub of the flywheel 128. Formed on the shaft 125 is a gear 129 which meshes with the three planetary gears 130. These gears 130 are mounted upon three shafts 130' and are carried by the drum 126 and are connected with sets of intermediate and low speed gears 131 and 132, preferably. There are provided nine planetary gears, three in a set, as is the case in the preferred form of the invention. The gears 131 mesh with the low speed gear 133 which is carried upon the low speed shaft 134, said shaft having a clutch member 135 upon its rear end. Surrounding the shaft 134 is a tubular intermediate speed shaft 136 which upon its outer end carries a gear 137, meshing with the gears 132. On its rear end the shaft 136 is provided with a clutch member 138. A clutch sleeve 139 is splined as at 140 upon the driven shaft 141 and carries a slidable clutch member 142 adapted for cooperation with the clutch members 135 and 138. Connected with the clutch sleeves 139 is an arm 143 which is secured to the sliding armatures 144 and 145 of solenoids 146 and 147, said solenoids being carried by the frame 148 for the transmission mechanism and the solenoid 146 moves the arm 143 and clutch sleeve 139 so as to bring the clutch member 142 into cooperative relation to the low gear clutch member 135, whereas the solenoid 147 when energized moves the armature 145, arm 143, clutch sleeve 139 so that the clutch member 142 cooperates with the intermediate speed clutch member 138.

Magnet members 149 are mounted on open sides of the drum 126, said magnet members being identical in construction to the corresponding magnet members in the preferred form of the invention and acting when energized to hold the drum 126 against rotation.

There is provided a drum 150 which corresponds to the drum 46 in the preferred form of the invention and is of the same diameter and circumference as the drum 126. This drum surrounds the shafts 136 and 134. The drum 150 is provided with a central hub portion or sleeve 151 which is keyed as at 152 to the intermediate speed shaft 136. This hub member or sleeve 151 telescopes the clutch sleeve 139 and slidably supports the clutch sleeve 153. The clutch sleeve 153 is provided with a jaw clutch member 154 that extends within openings 155 formed through the drum 150 around the center of the drum. A jaw clutch member 156 is secured as at 157 to the drum 126 and is adapted to cooperate with the clutch member 155 to lock the drums 126 and 150 for rotation together. The clutch member 154 normally rests in the position shown in the drawings within the openings 155 and clear of the clutch member 156 so that the drums may rotate relative to one another. There is provided spring means in the form of an expansion helical spring 158 mounted upon the sleeve 153 which engages an abutment 159 on the sleeve and a ring abutment member 160 which is screw-threaded upon the sleeve 151 at the rear end of said sleeve 151. A cover band or ring 161 surrounds the spring in spaced relation thereto and is screw-threaded as at 162 upon the abutment 159 but has sliding engagement with the ring 160. The spring 158 tends to hold the clutch member 154 in cooperative relation to the clutch member 156, and to provide for the holding of the clutch member 154 in neutral position, as shown in the drawings, magnetic means in the form of a solenoid 163 is used. This solenoid is secured to a suitable part of the frame 148 for the mechanism and attached to its armature 164 is an L-shaped arm 165 that is mounted within a groove 166 formed on the clutch sleeve 153. It will thus be seen that when the solenoid 163 is energized the arm 165 is retracted, holding the clutch sleeve 153 in neutral position against the action of the spring 158 and that upon the energization of the solenoid 163 the spring 158 moves the clutch sleeve 153 forwardly and clutch member 154 into cooperative relation to the clutch member 156, thus locking the two drums.

There is provided electromagnetic members 167 on opposite sides of the drum 150. These members 167 are identical in construction to the members 49 and function to hold the drum 150 against rotation when energized.

The electric circuit for the magnet members of the mechanism is the same as the electric circuit for the preferred form of mechanism and the operation of this form of the invention is the same as in the preferred form, the only difference between the forms being that a multiple disk clutch is used as a locking means for the drum in the preferred form and a sliding jaw clutch is used as a locking means in the modified form.

There is provided a means to return the sliding clutch member to normal position which comprises expansion springs 168 secured to and mounted on opposite sides of an extension 170 of the arms 143. The other ends of the springs are secured to and abut plates 169 so that when either of the magnets which control the movement of the arm 143 is de-energized the springs will act to return the arm and its connected parts to normal position. This construction is the same as employed in the preferred form of the invention.

Because of the particular combination, described above, of the electromagnetic means to hold the drums 14 and 46 stationary, the generator furnishing electric current for energization of the electromagnetic means, and the engine operating the generator it is clear that, if the load on the engine be increased beyond its driving capacity with the particular gear ratio being employed at the time, the engine will be caused to slow down, thus diminishing the speed of the generator which in consequence will furnish less electric current to the electromagnetic means so as to diminish the holding effect on the drums and thus allow rotation of said drums, thus automatically reducing the load on the engine and so avoiding stalling of the engine.

I claim:

1. The combination with a motor driven vehicle, of a drive shaft operated by the motor, a driven shaft, a drive gear rotated by the drive shaft, change speed shafts, means to connect any one of the change speed shafts with the driven shaft, gears fixed to the change speed shafts, a member mounted for rotation around the shafts, planetary gears rotatably mounted on the member and meshing with the drive gear and gears on the change speed shafts, means to hold the member against rotation, another member mounted for rotation around the shafts and for rotation with one of said change speed shafts, and means to hold said last named member against rotation, said means being operative by and varying in holding effect with the speed of the motor.

2. The combination with a motor driven vehicle, of a drive shaft operated by the motor, a driven shaft, a drive gear rotated by the drive shaft, change speed shafts, means to connect any one of the change speed shafts with the driven shaft, gears fixed to the change speed shafts, a member mounted for rotation around the shafts, planetary gears rotatably mounted on the member and meshing with the drive gear and gears on the change speed shafts, means to hold the member against rotation, another member mounted for rotation around the shafts and for rotation with one of said change speed shafts, means to hold said last named member against rotation, said last named means being operative by and varying in holding effect with the speed of the motor, and means to lock the members together for corresponding rotation.

3. The combination with a motor driven vehicle, of a drive shaft operated by the motor, a driven shaft, a drive gear rotated by the drive shaft, change speed shafts, means to connect any one of the change speed shafts with the driven shaft, gears fixed to the change speed shafts, members mounted for relative rotation around the shafts, means to lock the members together for corresponding rotation, planetary gears on one of the members meshing with the first and last named gears, the other of said members being fixed to one of the change speed shafts, and means to hold any one of the members against rotation relative to the other, said last named means being operative by and varying in holding effect with the speed of the motor.

4. The combination with a motor vehicle including a motor, a drive shaft operated by the motor, a driven shaft and a generator operated by the motor, of change speed mechanism including a drive gear, a member rotating around the gear, planetary gears on said member meshing with the drive gear, means for operatively connecting the planetary gears with the driven shaft including a clutch member, and an electromagnet mounted to attract and hold the member against rotation, being connected with the generator whereby the degree of magnetic influence is varied in accordance with the speed of the motor.

5. The combination with a motor driven vehicle, of a generator driven by the motor, a drive shaft operated by the motor, a driven shaft, a drive gear rotated by the drive shaft, change speed shafts, means to connect any one of the change speed shafts with the driven shaft, gears fixed to the change speed shafts, members mounted for rotation around the shafts, one of said members being keyed to one of said change speed shafts, planetary gears rotatably mounted on the other of the members and meshing with the first and second named gears, independently operable means for holding said members against rotation, means for locking said members to permit them to rotate correspondingly when the members are free to rotate, and electromagnetic means for operating said last named means, said last named means being energized by the operation of the generator.

6. In transmission mechanism, the combination with a drive shaft and a driven shaft, of a drive gear operated by the drive shaft, change speed shafts, sliding clutch means to connect any one of the change speed shafts with the driven shaft, a drum surrounding and rotating around the drive gear, planetary gears rotatably mounted upon the drum and meshing with the drive and change speed gears, arcuate electromagnet members mounted on opposite sides of the drum and adapted to magnetically attract and hold the drum against rotation, a member mounted for rotation around the change speed shafts, arcuate electromagnet members mounted on opposite sides of and adapted to hold said member against rotation, said member being keyed to one of the change speed shafts, disks fixed to the drum and member and having overlapping engagement with one another, and means to clamp said disks in close frictional engagement with one another to lock the drum and member for corresponding rotation.

7. In transmission mechanism, a drive shaft, a driven shaft, a drive gear shaft fixed to the drive shaft, a drive gear on the drive gear shaft, tubular concentric change speed shafts, one of said change speed shafts receiving the drive gear shaft and driven shaft, gears mounted on the change speed shaft, a member fixed to one of the change speed shafts and adapted for rotation with said shaft, another member mounted for rotation around the drive gear, shafts fixed to said last named member in arcuate relation to the drive gear and change speed gears, a plurality of gears in fixed relation to one another rotatably mounted upon the last named shafts and meshing with the drive gear and change speed gears, electromagnets mounted in position to attract and hold the last named member against rotation so that the gears on the last named shaft are held against planetary movement, means to connect any one of the change speed shafts with the driven shaft, means to lock the first and second named rotating members for corresponding rotation, and means to hold said first named member against rotation.

8. In transmission mechanism, a drive shaft, a driven shaft, change speed shafts, means to connect any one of the change speed shafts with the driven shaft, a drive gear operated by the drive shaft, gears fixed to the change speed shafts, said change speed shafts being concentric with the drive and driven shafts, members mounted for independent rotation around the shafts, one of said members being keyed to one of the change speed shafts, planetary gears carried by the other of said members and meshing with the drive and change speed gears, magnetic means for independently attracting and holding the members against rotation, a clutch member carried by one of said members, a sliding clutch member operatively connected for rotation with the other member, and means to move said sliding clutch member into engagement with the first named clutch member to lock the member for corresponding rotation.

9. A support, contact members on the support, a contact lever movable on the support to engage the contact members, a bridge contact member extending above the contact members and being engaged by the lever, said bridge contact member having one end inclined downwardly and located near the support, said lever adapted to pass under the bridge in engagement therewith when moved in one direction and over the bridge in engagement with the upper side thereof when moved in the opposite direction.

10. A support, contact members on the support, a contact lever movable on the support to engage the contact members, a bridge contact member extending above the contact members and being engaged by the lever, said bridge contact member having one end inclined downwardly and located near the support, said lever adapted to pass under the bridge in engagement therewith when moved in one direction and over the bridge in engagement with the upper side thereof when moved in the opposite direction, and said bridge having an upwardly bowed portion intermediate its ends whereby the lever does not come into contact therewith when moved under the bridge.

11. The combination with a motor driven vehicle, of planetary change speed gearing connected with the motor and with the vehicle wheels, and means increasing in retarding effect in accordance as the speed of the engine increases to prevent planetary motion of the planetary gears.

12. The combination with a motor driven vehicle, of planetary change speed gearing connected with the motor and with the vehicle wheels, a generator operated by the motor, and an electromagnetic device operated by electric current from the generator to prevent planetary motion of the planetary gears, the magnetic pull of said electromagnetic device varying in accordance with the speed of the generator.

13. In transmission mechanism, a drive shaft, a driven shaft, change speed shafts, a drive gear operated by the drive shaft, gears fixed to the change speed shafts, members mounted for independent rotation around the shafts, one of said members being fixed to one of the change speed shafts, planetary gears carried by the other of said members and meshing with the drive and change speed gears, a clutch member carried by the second named member, a clutch member operatively connected for rotation with the first named member, means to yieldingly hold one of said clutch members engaged with the other, clutch members for the change speed shafts respectively, a clutch member rotative with the driven shaft, and means to simultaneously hold the second named member and move the last named clutch member into engagement with either of the change speed clutch members and throw the clutch member holding means out of clutching position.

14. In transmission mechanism, a drive shaft, a driven shaft, change speed shafts, a drive gear operated by the drive shaft, gears fixed to the change speed shafts, members mounted for independent rotation around the shafts, one of said members being fixed to one of the change speed shafts, planetary gears carried by the other of said members and meshing with the drive and change speed gears, means to hold said members against rotation, a clutch member carried by the second named member, a clutch member operatively connected for rotation with the first named member, clutch members for the change speed shafts respectively, a clutch member rotative with the driven shaft, and means to simultaneously throw the member holding means out of commission and hold the first and second named clutch members engaged with one another and throw the fourth named clutch member into engagement with one of the change speed clutch members.

15. In transmission mechanism, a drive shaft, a driven shaft, change speed shafts, a drive gear operated by the drive shaft, gears fixed to the change speed shafts, members mounted for independent rotation around the shafts, one of said members being fixed to one of the change speed shafts, planetary gears carried by the other of said members, and meshing with the drive and change speed gears, means to hold said members against rotation, a clutch member carried by the second named member, a clutch member operatively connected for rotation with the first named member, means to yieldingly hold one of said clutch members engaged with the other, clutch members for the change speed shafts respectively, a clutch member rotative with the driven shaft, and means to simultaneously throw the member holding means out of commission and hold the first and second named clutch members disengaged and move the fourth named clutch member out of engagement with either of the change speed clutch members.

16. In transmission mechanism, a drive shaft, a driven shaft, change speed shafts, a drive gear operated by the drive shaft, low and intermediate speed gears fixed to the change speed shafts, members mounted for independent rotation around the shafts, one of said members being fixed to one of the change speed shafts, planetary gears carried by the other of said members and meshing with the drive and change speed gears, means to hold said members against rotation, a clutch member carried by the second named member, a clutch member operatively connected for rotation with the first named member, means to yieldingly hold one of said clutch members engaged with the other, clutch members for the change speed shafts respectively, a clutch member rotative with the driven shaft, and means to simultaneously throw the holding means of the first named member into commission and the holding means of the second named member out of commission and hold the first and second named clutch members disengaged and move the last named clutch member into engagement with the clutch member of the shaft having the low speed gear.

17. In transmission mechanism, a drive shaft, a driven shaft, change speed shafts, a drive gear operated by the drive shaft, gears fixed to the change speed shafts, members mounted for independent rotation around the shafts, one of said members being fixed to one of the change speed shafts, planetary gears carried by the other of said members and meshing with the drive and change speed gears, a clutch member carried by the second named member, a clutch member operatively connected for rotation with the first named member, means to yieldingly hold one of said clutch members engaged with the other, clutch members for the change speed shafts respectively, a clutch member rotative with the driven shaft, and electrically operated means to simultaneously hold the second named members and move the last named clutch members into engagement with either of the change speed clutch members and throw the clutch member holding means out of commission.

18. In transmission mechanism, a drive shaft, a driven shaft, change speed shafts, a drive gear operated by the drive shaft, gears fixed to the change speed shafts, members mounted for independent rotation around the shafts, one of said members being fixed to one of the change speed shafts, planetary gears carried by the other of said members and meshing with the drive and change speed gears, means to hold said members against rotation, a clutch member carried by the second named member, a clutch member operatively connected for rotation with the first named member, means to yieldingly hold one of said clutch members engaged with the other, clutch members for the change speed shafts respectively, a clutch member rotative with the driven shaft, and electrically operated means to simultaneously throw the member holding means out of commission and throw the holding means of the first named clutch members out of commission, and throw the fourth named clutch member into engagement with one of the change speed clutch members.

19. In transmission mechanism, a drive shaft, a driven shaft, change speed shafts, a driven gear operated by the drive shaft, gears fixed to the change speed shafts, members mounted for independent rotation around the shafts, one of said members being fixed to one of the change speed shafts, planetary gears carried by the other of said members and meshing with the drive and change speed gears, means to hold said members against rotation, a clutch member carried by the second named member, a clutch member operatively connected for rotation with the first named member, means to yieldingly hold one of said clutch members engaged with the other, clutch members for the change speed shafts respectively, means to yieldingly hold the last named clutch members disengaged, means to hold the last named clutch members engaged, a clutch member rotative with the driven shaft, and electrically operated means to simultaneously throw the member holding means out of commission and hold the first and second named clutch members disengaged and release the holding means of the change speed clutch members.

20. In transmission mechanism, a drive shaft, a driven shaft, change speed shafts, a drive gear operated by the drive shaft, low and intermediate speed gears fixed to the change speed shafts, members mounted for independent rotation around the shafts, one of said members being fixed to one of the change speed shafts, planetary gears carried by the other of said members and meshing with the drive and change speed gears, means to hold said members against rotation, a clutch member carried by the second named member, a clutch member operatively connected for rotation with the first named member, means to yieldingly hold one of said clutch members engaged with the other, clutch members for the change speed shafts respectively, a clutch member rotative with the driven shaft, and electrically operated means to simultaneously throw the holding means of the first named member into commission and the holding means of the second named member out of commission and hold the first and second named clutch members disengaged and move the last named clutch member into engagement with the clutch member of the shaft having the low speed gear.

Signed at Los Angeles, California, this 26th day of June, 1917.

ARNOLD H. JESSEN.

Witnesses:
CHAS. J. CHUNN,
L. BELLE WEAVER.